June 23, 1959 E. H. TURNER 2,892,159
NONRECIPROCAL CIRCUIT ELEMENT
Filed Aug. 6, 1956
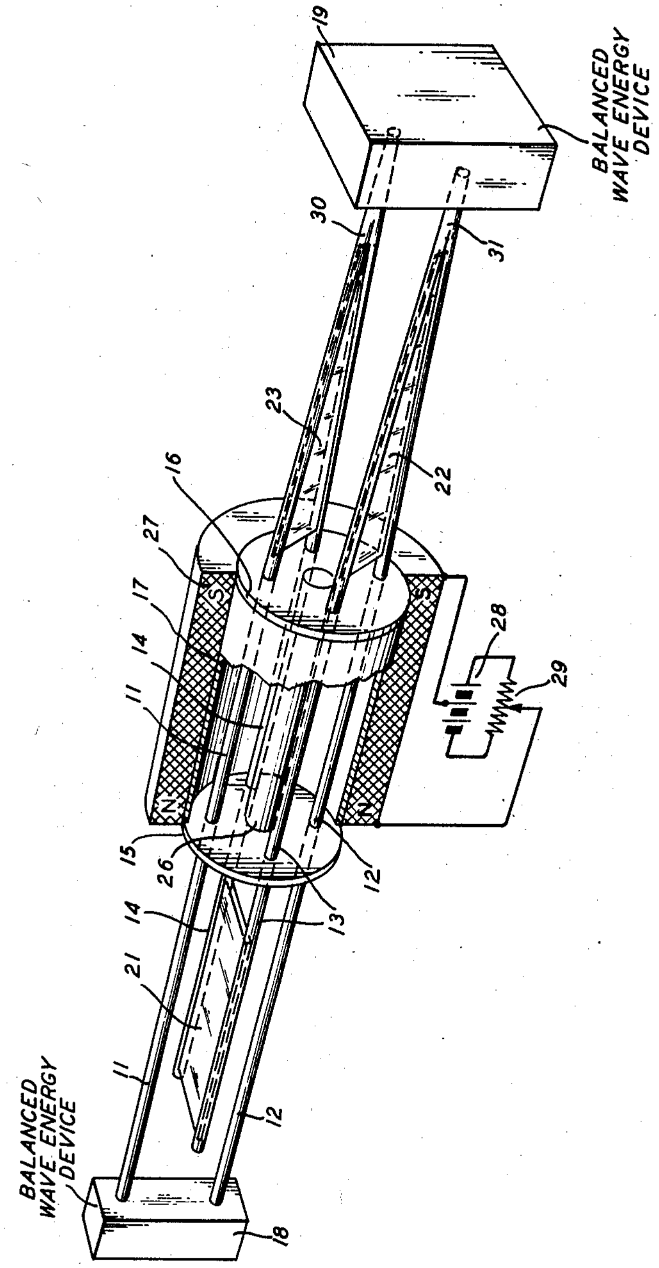
INVENTOR
E. H. TURNER
BY Roy M. Porter, Jr.
ATTORNEY

United States Patent Office 2,892,159

Patented June 23, 1959

2,892,159

NONRECIPROCAL CIRCUIT ELEMENT

Edward H. Turner, Red Bank, N.J., assignor to Bell Telephone Laboratories, Incorporated, New York, N.Y., a corporation of New York Application August 6, 1956, Serial No. 602,152

6 Claims. (Cl. 333—24)

This invention relates to nonreciprocal transmission circuits for electromagnetic wave energy and more particularly, to multibranch networks known as isolators for wave energy in the frequency ranges below a few thousand megacycles.

It is an object of the invention to couple electromagnetic wave energy from one balanced transmission line pair to a second transmission line pair for one direction of transmission therebetween, and to introduce substantial attenuation to wave energy transmitted in the opposite direction of transmission.

In the copending applications of J. H. Rowen, Serial No. 544,783, filed November 3, 1955; Serial No. 485,280 filed January 31, 1955; and the application of A. M. Clogston, Serial No. 485,281, filed January 31, 1955, there are disclosed structures and techniques for utilizing one or more of the several nonreciprocal effects produced by polarized elements of gyromagnetic material such as ferrite at frequencies of wave energy below a few thousand megacycles. Among these structures are included two branch coaxial, or balanced transmission line devices capable of introducing a nonreciprocal attenuation to wave energy in the frequency ranges in which coaxial and balanced transmission lines are used. These devices are known as isolators. Operation of these isolators depends upon the phenomena of gyromagnetic resonance absorption which works quite efficiently to isolate low powers but is incapable of introducing the large amount of reverse loss attenuation required in some high power applications.

It is, therefore, a further object of the invention to increase the reverse loss or isolation for isolators operating in the frequency ranges below the microwave range.

In accordance with the present invention, four conductors are arranged in diametrically opposite pairs with a longitudinally biased gyromagnetic element centrally disposed with respect to said conductors. Wave energy components applied from a connected electromagnetic wave device to one end of a first of the pairs will be transferred to the second of the pairs by the precessing electrons within the gyromagnetic material. As the energy propagates toward the other end of the structure, one-half of the applied energy will eventually be transferred to the second pair. At this point the second ends of the two pairs are brought together in a parallel connection such that the two halves are recombined for delivery to a connected output load. The transfer of energy between the pairs by the electron precession is antireciprocal, however, and continues in the same sense regardless of the direction of propagation. Therefore, if energy is applied to the other ends, for example, as a reflection from the load, the parallel connection will set up equal components on the two pairs for propagation toward the first end and the components supported on the first pair will be successively transferred to the second pair. Selective dissipating means is located at the first end for dissipating energy supported by the second pair. Thus, no energy reaches the original source which is effectively isolated from its load. Additional dissipative means is located at the second end, selective for dissipating energy having an electric polarization normal to that delivered to the load and, therefore, serves to dissipate any reflections from the first dissipative means. The isolator is bilteral to the extent that reversing the direction of the biasing field upon the gyromagnetic material will reverse the respective directions of transmission and attenuation.

These and other objects, the nature of the present invention, and its various advantages and features will appear more fully upon consideration of the specific illustrative embodiment shown in the accompanying drawing and described in the following detailed description of this drawing in which is shown a perspective view of an isolator in accordance with the invention interposed schematically between two balanced wave energy devices.

Referring more particularly to the drawing, an illustrative embodiment is shown comprising four similar elongated conductors or wires 11 through 14 that extend parallel to each other longitudinally and are located transversely at equally spaced points around the circumference of the circle. The radius of each conductor should be small compared to the distance between the nearest conductor centers. Thin transversely extending dielectric spacers 15 and 16 are longitudinally spaced to support the conductors relative to each other in this relationship. Support is also provided by a rigid cylindrical shield 17 which may be made of conductive, nonconductive or electrically dissipative material. Shield 17 protects conductors 11 through 14 from outside mechanical and electrical influences but otherwise plays no substantial part in the electrical operation of this embodiment.

The left hand extensions of diametrically opposed conductors 11 and 12 comprising one pair are connected to a balanced electromagnetic device 18 which in one particular application of the invention would constitute a source of wave energy, but which might also be a load circuit or other wave energy utilizing device or a coupling transducer which in turn couples to a source or a load in another application. The connection from device 18 to pair 11—12 is such that coupling is provided to and from wave energy of maximum voltage intensity lying in the plane of the pair and supported between the conductors. At the right hand end one conductor of each pair is bent toward and joined with one conductor of the other pair so that the pairs are connected in parallel for delivery to a device 19 which in the particular application constitutes a load or other wave energy utilizing device, but might also be a source of energy or a transducer. As illustrated, conductor 12 of pair 11—12 and the circumferentially adjacent conductor 13 of pair 13—14 are joined together to become conductor 31. Likewise the circumferentially adjacent conductors 11 and 14 are joined together to become conductor 30. Therefore, device 19 connected across 30 and 31 is coupled to the voltage resultant of energy supported by both pairs that has has a maximum intensity lying at 45 degrees to the plane of either pair and perpendicular to the plane of the joined adjacent conductors.

Included between the left hand ends of conductors 13 and 14 is a thin vane 21 of electrically resistive material lying in the plane of conductors 13 and 14, extending longitudinally along several wave lengths of the operating frequency and extending transversely substantially from conductor 13 to conductor 14. Vane 21 may be made of plastic dielectric material such as polyfoam or Teflon impregnated or coated with powdered carbon or aquadag and is, therefore, capable of dissipating substantial electrical power. Similar vanes of dissipative material 22 and 23 are included between and in the plane of the right hand ends of joined conductors 12 and 13 and joined conductors 11 and 14, respectively. Vanes 22 and 23 are provided with a taper that conforms to the tapered space between the joined conductors.

In the region between vane 21 at the left hand end and vanes 22 and 23 at the right hand end of the conductors thus arranged, a nonreciprocal coupling is provided between the pairs by an elongated cylinder or pencil shaped element 26 of gyromagnetic material similarly disposed with respect to conductors 11 through 14 and extending longitudinally along the center of the circle defined by the transverse locations of the conductors. Element 26 may be supported in this position by extending it through centrally located apertures in spacers 15 and 16.

The material of element 26 is of the type having electrical and magnetic properties of the type described by the mathematical analysis of D. Polder in Philosophical Magazine, January 1949, volume 40, pages 99 through 115. More specifically, element 26 may be made of any of the several ferromagnetic materials combined in a spinel structure. For example, it may comprise iron oxide with a small quantity of one or more bivalent metals such as nickel, magnesium, zinc, manganese, aluminum, or other similar material in which the other metals combine with the iron oxide in a spinel structure. This material is known as a ferromagnetic spinel or as ferrite. Frequently these materials are first powdered and then molded with a small percentage of plastic material according to the process described in the publication of C. L. Hogan, "The Microwave Gyrator" in the Bell System Technical Journal, January 1952. One specific material which is particularly suitable at the lower frequencies contemplated by the present invention is magnesium-manganese-aluminum ferrite which has been found to exhibit a ferromagnetic resonance effect at a lower frequency range than prior considered ferrites with values of biasing magnetic field that are obtainable in practice. These frequencies have been observed to include the frequency range from below 170 megacycles per second to 2,000 megacycles per second at field strengths ranging from less than approximately 200 to 850 oersteds, respectively.

Element 26 is biased by a polarizing magnetic field applied parallel to conductors 11 through 14. This field may be supplied by a solenoid 27 mounted upon the outside of shield 17 and supplied by an energizing current from source 28 and rheostat 29. As illustrated, rheostat 29 is connected across source 28 so that the current through solenoid 27 may be reversed, reversing the direction of the biasing field supplied to element 26. It should be noted, however, that element 26 may be magnetized by a solenoid of other suitable physical design, by a permanent magnet structure, or the material of element 26 may be permanently magnetized.

The coupling produced by element 26 can be explained by the recognition that the gyromagnetic material of element 26 contains unpaired electron spins which tend to line up with the applied field. These spins have an associated magnetic moment which can be made to precess about the line of the biasing magnetic field, keeping an essentially constant moment component in the direction of the biasing field and at the same time providing a moment component which may rotate in a plane normal to the field direction. Thus when a reciprocating high frequency magnetic field of electromagnetic wave energy is impressed upon the moment, the moment will commence to precess in one angular sense and to resist rotation in the opposite sense.

The combined effect of many such electrons and their associated moments produces in the gyromagnetic material not only a flux representing the impressed magnetic field but also a flux representing a reciprocating field at right angles in space to the applied field and displaced in time from the applied field by a phase determined by the direction of precession of the electrons and independent of the direction of propagation of a wave along the lines. The amplitude of the coupled wave depends upon the parameters of the ferrite and may also be controlled by the strength of the biasing magnetic field.

Thus, when wave energy is applied from source 18 to pair 11—12, a voltage field will be set up between the conductors with a magnetic field concentric with each conductor and having a maximum concentration extending between the conductors in a plane normal to the plane of the conductors. Therefore, no current will be induced in vane 21 and none of the energy will be dissipated thereby. After passing vane 21 the wave field encounters element 26 and an induced magnetic field will be produced normal to the exciting field which in turn produces a voltage field extending between pair 13—14. Initially, this induced field will be small, but as the distance from the excited end is increased, the field becomes increasingly larger. At an appropriate electrical distance to the right, depending in a given structure, upon its physical length and the biasing field strength, the induced field will contain one-half of the energy. The phase of this induced energy relative to the remaining portion of the excited energy on pair 11—12, for the polarities indicated on solenoid 27, is such that when conductor 11 is positive with respect to conductor 12, conductor 14 is positive with respect to conductor 13. Conductors 12 and 13 may, therefore, be connected together to become conductor 31 and form the negative pole of the output. Similarly, conductors 11 and 14 may be connected together to become conductor 30 and form the positive pole of the output. Since the resultant of the total field comprises a voltage of maximum intensity directed normal to the plane of conductors 12 and 13 and the plane of conductors 11 and 14, no current is induced in vane 22 and 23, and no energy will be dissipated therein. The combined components are, therefore, delivered on conductors 30 and 31 to device 19 without substantial attenuation.

If energy were applied from device 19 acting now as a source of wave energy, or more probably, as an imperfectly matched load producing a reflection of energy, the energy will be divided into two equal components upon pairs 11—12 and 13—14. Conductors 12 and 13 will have the same sign as the energy propagates to the left. Since the transmission of energy between the pairs is antireciprocal, i.e., it continues in the same sense regardless of the direction of propagation, the components supported between pair 11—12 will be transferred to pair 13—14 as the wave propagates. At the point where the gyromagnetic coupling ceases, all energy will be supported between pair 13—14 with its electrical intensity lying in the plane of the pair and, therefore, in the plane of vane 21. These components will induce substantial currents in vane 21 and will be dissipated thereby with none of the energy reaching device 18.

Should energy be reflected from vane 21 due to any impedance discontinuity that it presents, the reflected energy will constitute a voltage between pair 13—14 propagating to the right. During passage along the ferrite coupling region one-half of it will be transferred to pair 11—12 in such a phase that if conductor 13 of pair 13—14 is positive, conductor 11 of pair 11—12 will also be positive. The voltage resultant of the two components, therefore, lies in a plane parallel to vanes 22 and 23 by which the power thereof is substantially dissipated.

Should the magnetic field supplied by solenoid 27 be reversed by moving rheostat 29 to a position on the other side of its center, the above-described directions of transmission and attenuation would be reversed. Thus, wave energy applied from device 19 will appear with substantially no attenuation at device 18. Reflections from device 18 will primarily be dissipated in vanes 22 and 23.

Reflections from these vanes will in turn be dissipated in vane 21.

In all cases it is understood that the above-described arrangements are illustrative of a small number of the many specific embodiments which can represent applications of the principles of the invention. Numerous and varied other arrangements can readily be devised in accordance with these principles by those skilled in the art without departing from the spirit and scope of the invention.

What is claimed is:

1. An isolator circuit for electromagnetic wave energy comprising a plurality of elongated conductors being equally spaced transversely around the circumference of a circle with one conductor diametrically opposite each conductor and two conductors circumferentially adjacent each conductor, said conductors extending longitudinally parallel to each other for a major portion of their lengths with one end of each conductor joined to one of its adjacent conductors, an elongated element of magnetically polarized material exhibiting the gyromagnetic effect at the frequency of said wave energy extending parallel to said conductors through the center of said circle, a vane of electrically dissipative material extending transversely parallel to the plane of one pair of opposite conductors and longitudinally for several wavelengths of said energy on the side of said element opposite said joined end, and at least one other vane of electrically dissipative material extending transversely parallel to the plane of one pair of adjacent conductors and longitudinally for several wavelengths of said energy on the other side of said element.

2. An isolator according to claim 1 including a pair of parallel vanes of dissipative material extending respectively in the planes of adjacent conductors.

3. An isolator according to claim 2 wherein said adjacent conductors are bent toward each other and connected together in the respective planes of said parallel vanes.

4. An isolator circuit for electromagnetic wave energy comprising a plurality of elongated conductors being disposed symmetrically relative to each other in diametrically opposite pairs, an elongated element of magnetically polarized material exhibiting the gyromagnetic effect at the frequency of said wave energy centrally disposed with respect to said conductors, said conductors and said element extending parallel to each other, a vane of electrically dissipative material extending in the plane of one pair of conductors on one side of said element, one conductor of each pair being shorted on the other side of said element to one conductor of the other pair, and at least one other vane of electrically dissipative material extending in a plane parallel to the plane of said shorted conductors on said other side of said element.

5. The component according to claim 4 including an electromagnetic wave device coupled on said one side of said element to wave energy having an electric field extending between the other pair of conductors and another electromagnetic wave device coupled on said other side of said element to wave energy having an electric field extending perpendicular to said plane of said shorted conductors.

6. An isolator circuit comprising a plurality of elongated conductors being equally spaced transversely around the circumference of a circle with one conductor diametrically opposite each conductor and two conductors circumferentially adjacent each conductor, said conductors extending longitudinally parallel to each other for a major portion of their lengths with one end of each conductor joined to one of its adjacent conductors to form two pairs of joined conductors, an electromagnetic wave device coupled with a voltage supported between said pairs of joined conductors, a second electromagnetic wave device coupled with a voltage supported between the other end of one pair of opposite conductors, an elongated element of magnetically polarized material exhibiting the gyromagnetic effect at the frequency of wave energy operable with said devices extending parallel to said conductors through the center of said circle, and at least one vane of electrically dissipative material extending transversely parallel to the plane of a pair of conductors and longitudinally for several wave lengths of said energy.

References Cited in the file of this patent

UNITED STATES PATENTS

| | | |
|---|---|---|
| 2,748,353 | Hogan | May 29, 1956 |
| 2,752,572 | Bird | June 26, 1956 |

FOREIGN PATENTS

| | | |
|---|---|---|
| 1,111,860 | France | Nov. 2, 1955 |